United States Patent
Tsirkin et al.

(10) Patent No.: US 12,175,269 B2
(45) Date of Patent: Dec. 24, 2024

(54) MEMORY PAGE COPYING FOR VIRTUAL MACHINE MIGRATION

(71) Applicant: Red Hat, Inc., Raleigh, NC (US)

(72) Inventors: Michael Tsirkin, Yokneam Illit (IL); David Alan Gilbert, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 951 days.

(21) Appl. No.: 17/185,621

(22) Filed: Feb. 25, 2021

(65) Prior Publication Data
US 2022/0269521 A1    Aug. 25, 2022

(51) Int. Cl.
G06F 9/455    (2018.01)

(52) U.S. Cl.
CPC .. G06F 9/45558 (2013.01); *G06F 2009/4557* (2013.01); *G06F 2009/45583* (2013.01)

(58) Field of Classification Search
CPC ...................... G06F 9/45558; G06F 2009/4557
See application file for complete search history.

(56) References Cited

U.S. PATENT DOCUMENTS

| | | | |
|---|---|---|---|
| 8,239,609 B2 | 8/2012 | Hudzia et al. | |
| 8,327,060 B2 | 12/2012 | Heim | |
| 8,538,919 B1* | 9/2013 | Nielsen | H04L 63/0272 718/1 |
| 9,053,053 B2 | 6/2015 | Bacher et al. | |
| 9,454,400 B2 | 9/2016 | Tsirkin et al. | |
| 9,823,842 B2* | 11/2017 | Gopalan | G06F 9/455 |
| 9,910,906 B2* | 3/2018 | Karve | H04L 67/34 |
| 10,007,609 B2 | 6/2018 | Dube et al. | |
| 2014/0149984 A1* | 5/2014 | Takahashi | G06F 9/4856 718/1 |
| 2017/0277555 A1* | 9/2017 | Gautam | G06F 16/137 |
| 2018/0150335 A1* | 5/2018 | Doi | G06F 11/3037 |
| 2018/0329737 A1 | 11/2018 | Dong et al. | |
| 2019/0065228 A1* | 2/2019 | Tsirkin | G06F 9/45558 |
| 2019/0370113 A1* | 12/2019 | Zhao | G06F 9/545 |
| 2020/0142624 A1* | 5/2020 | Kucherov | G06F 3/0647 |

OTHER PUBLICATIONS

Jin et al., "Live Virtual Machine Migration with Adaptive Memory Compression", Services Computing Technology and System Lab, Cluster and Grid Computing Lab School of Computer Science and Technology Huazhong University of Science and Technology, Wuhan, China, Oct. 2009, 12 pages https://www.researchgate.net/publication/224605044_Live_virtual_machine_migration_with_adaptive_memory_compression.

Hagoort, "The vMotion Process Under the Hood", VMware, Inc., Jul. 9, 2019, 15 pages https://blogs.vmware.com/vsphere/2019/07/the-vmotion-process-under-the-hood.html.

* cited by examiner

*Primary Examiner* — Kenneth Tang
*Assistant Examiner* — Kevin X Lu
(74) *Attorney, Agent, or Firm* — Dority & Manning, P.A.

(57) ABSTRACT

Systems and methods of the disclosure include: identifying, by a destination host computer system, a first memory page residing in a memory of the destination host computer system; transmitting, by the destination host computer system, at least a part of the first memory page to a source host computer system; receiving, by the destination host computer system, a confirmation from the source host computer system that the first memory page matches a second memory page associated with a virtual machine to be migrated from the source host computer system to the destination host computer system; and associating, by the destination host computer system, the first memory page with the virtual machine.

17 Claims, 5 Drawing Sheets

MEMORY PAGE COPYING FOR VIRTUAL MACHINE MIGRATION

TECHNICAL FIELD

The implementations of the disclosure generally relate to virtualization systems and, more specifically, to systems and methods for memory page copying for virtual machine migration.

BACKGROUND

Virtualization is a computing technique that improves system utilization, decoupling applications from the underlying hardware, and enhancing workload mobility and protection. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system is typically referred to as a "host machine," and the operating system of the host machine is typically referred to as the "host operating system." A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, and so on. A VM may have a virtual processor, virtual system memory, virtual storage, and various virtual devices. VMs may be migrated between a source host computing platform ("the source host") and a destination host computing platform ("the destination host") connected over a network, which may be a local-area network (LAN) or a wide-area network (WAN) that may include the Internet.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods for memory page copying for virtual machine migration. "Memory page" herein refers to a continuous part of memory.

One approach for migration of a VM from a source host computer system (source host) to a destination host computer system (destination host) over a network is to permit a VM running on the source host to continue to run during the migration process, which is referred to as live migration. Live migration typically permits a running VM to be moved between different host computer systems transparently for application programs running on the VM and for their respective clients. For successful live migration, VM memory, processor state, and network connectivity should be migrated from the source host to the destination host.

During live migration, the migration agent may copy the VM memory pages from the source host to the destination host over a network while the VM is still running on the source host. While the memory pages are being copied during live migration, pages that have already been copied to the destination host may be overwritten ("dirtied") by applications currently executing on the VM, which, at that time, is still running on the source host. The dirtied memory pages may be re-copied to the destination until the page-dirtying rate falls below the rate of re-copying the memory pages. In order to identify the memory pages that have been dirtied and therefore need to be re-copied to the destination host, the hypervisor may track the memory write requests with respect to the VM memory pages by write-protecting the memory pages (e.g., by setting a flag in a page table entry corresponding to a memory page to be write-protected) on the source host. When a guest application attempts to write to a write-protected memory page, an ensuing page fault would cause a VM exit (i.e., a hardware event yielding the execution control to the hypervisor). Consecutively, the hypervisor may allow the memory page to be modified while recording an identifier (e.g., an address) of the memory page to a write request data structure, such as a list or a table. However, write-protecting multiple memory pages would result in a large number of computationally expensive VM exits due to the inevitable page faults, thus adversely affecting the overall efficiency of the live migration process.

Responsive to the page fault, the memory page may be copied from the source host to the destination host. However, copying memory pages from the source host to the destination host may take, e.g., several milliseconds to several seconds, thus limiting the ability to use VM migration to handle high-speed events including, for example, load balancing and host instability due to a slow transmission speed. Furthermore, the inefficiency of copying memory pages from the source host to the destination host is exacerbated when multiple VMs need to be migrated. One solution to this problem may be to increase network speed in order to obtain a faster VM migration. However, this solution may be very expensive or impossible to implement.

Aspects of the present disclosure increase the speed and efficiency of the VM live migration process by providing systems and methods of memory page copying for virtual machine migration. Implementations of the present disclosure exploit the full-duplex nature of the communication networks interconnecting host computer systems running virtual machines. Accordingly, migrating a virtual machine from a source host to a destination host, may involve, in addition to transmitting virtual machine memory pages from the source host to the destination host, also identifying candidate memory pages on the destination host and forwarding the identified candidate memory pages to the source host for comparison, thus effectively utilizing both directions of the communication network. Upon receiving, from the source host, a confirmation of a candidate memory page matching the page received from the destination host, the latter may utilize the page for a virtual machine being migrated from the source host to the destination host, as described in more detail herein below.

By transmitting the memory pages in the reverse direction (i.e., from the destination host to the source host), implementations of the present disclosure may be advantageously implemented in the asymmetric networking environment, such as asymmetric digital subscriber line (ADSL) or cable connections, especially in a situation when the source and the destination are connected by low bandwidth uplink, while the downlink provides higher bandwidth for transmissions from the destination to the source.

Various aspects of the above referenced methods and systems are described in details herein below by way of examples, rather than by way of limitation. The examples provided below discuss a virtualized computer system where memory page copying for virtual machine migration may be initiated by aspects of a hypervisor, a host operating system, a virtual machine, or a combination thereof. In other examples, the memory page copying for virtual machine migration may be performed in a non-virtualized computer system that is absent a hypervisor or other virtualization features discussed below.

Figure 1:
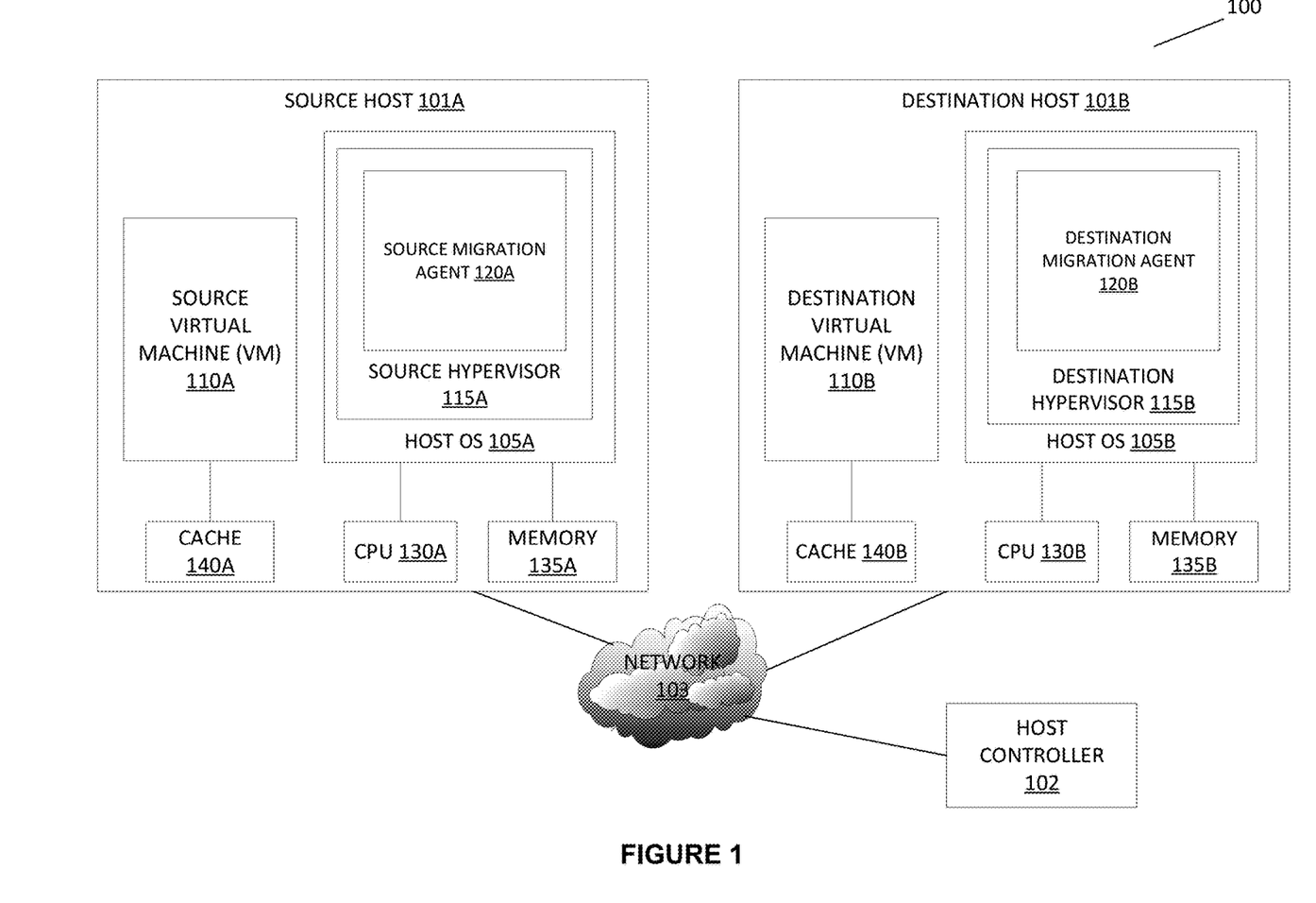
FIG. 1 is a block diagram that illustrates sample virtualization architecture 100 in accordance with one or more aspects of the present disclosure.

FIG. 1 is a block diagram that illustrates sample virtualization architecture 100 in accordance with one or more aspects of the present disclosure. The virtualization architecture 100 can include a source host computer system 101A, a destination host computer system 101B, and a host controller 102. The source host computer system 101A, destination host computer system 101B, and a host controller 102 can be communicably connected over a network 103. The network 103 can be a private network (e.g., a local area network (LAN), a wide area network (WAN), intranet, etc.) or a public network (e.g., the Internet).

The source host computer system 101A and destination host computer system 101B can be a server, a workstation, a personal computer (PC), a mobile phone, a smart phone, a mobile computing device, a personal digital assistant (PDA), tablet, laptop computer, thin client, etc. The source host computer system 101A and destination host computer system 101B can include one or more physical central processing units (CPUs) 130A-130B, memory 135A-135B, and peripheral devices (not illustrated). The physical devices can be any type of devices, including a data storage device or mass storage device, such as a magnetic or optical storage based disk, tape or hard drive. Other examples of physical devices can include network devices, graphics devices, system components (e.g., bridges, ports, buses) media devices, (e.g., video cards, sounds cards, etc.).

The source host computer system 101A and destination host computer system 101B can include one or more virtual machines 110A-110B and execute operating systems ("host OS") 105A-105B to manage resources (e.g., CPU 130A-130B, memory 135A-135B, physical devices, etc.), respectively. The virtual machines 110A-110B can run a guest operating system ("guest OS").

The host OS 105A-105B can include hypervisors 115A-115B. The hypervisors 115A-115B can also be known as a virtual machine monitor (VMM) or a kernel-based hypervisor. The hypervisors 115A-115B can be part of the host OS 105A-105B, run on top of the host OS 105A-105B, or run directly on the host hardware without an operating system beneath it. The hypervisors 115A-115B can assign physical devices to the virtual machines 110A-110B and can expose the physical devices to the guest OS of the virtual machines 110A-110B as a part of the virtual machines 110A-110B. In some implementations, the hypervisors 115A-115B can include migration agents 120A-120B. Although the migration agents 120A-120B are shown as a part of the hypervisors 115A-115B, they can be separate components coupled to hypervisors 115A-115B.

The migration agents 120A-120B at the respective host computer system 101A-101B manage migration of the source virtual machine 110A from the source host 101A to the destination host 101B in accordance with commands from a host controller 102. The host controller 102 can manage migration of the source virtual machine 110A from the source host 101A to the destination host 101B by coordinating with the migration agents 120A and 120B at the host computer systems 101A and 101B. The host controller 102 can reside on a designated computer system (e.g., a server computer, a desktop computer, etc.) or be part of the host computer systems 101A and 101B or another machine. The host controller 102 can issue a request to migrate the source virtual machine 110A from the source host computer system 101A to the destination host computer systems 101B. In an illustrative example, the host controller 102 can issue the migration request in response to detecting a triggering event such as a migration request received via a graphical user interface (GUI) or an application programming interface (API). In another illustrative example, the host controller 102 can issue the migration request in response to detecting a triggering condition, e.g., resource utilization by the source host computer system 101A exceeding a threshold. After the source virtual machine 110A has been migrated to the destination host computer system 101B, the host controller 102 can instruct the destination host computer system 101B to start the migrated virtual machine 110B via the migration agent 120B.

The "source" and "destination" designations for the host computer systems, hypervisors, virtual machines, migration agents, and hardware configuration monitors are provided for reference purposes in illustrating example implementations of the migration process according to embodiments.

Figure 2:
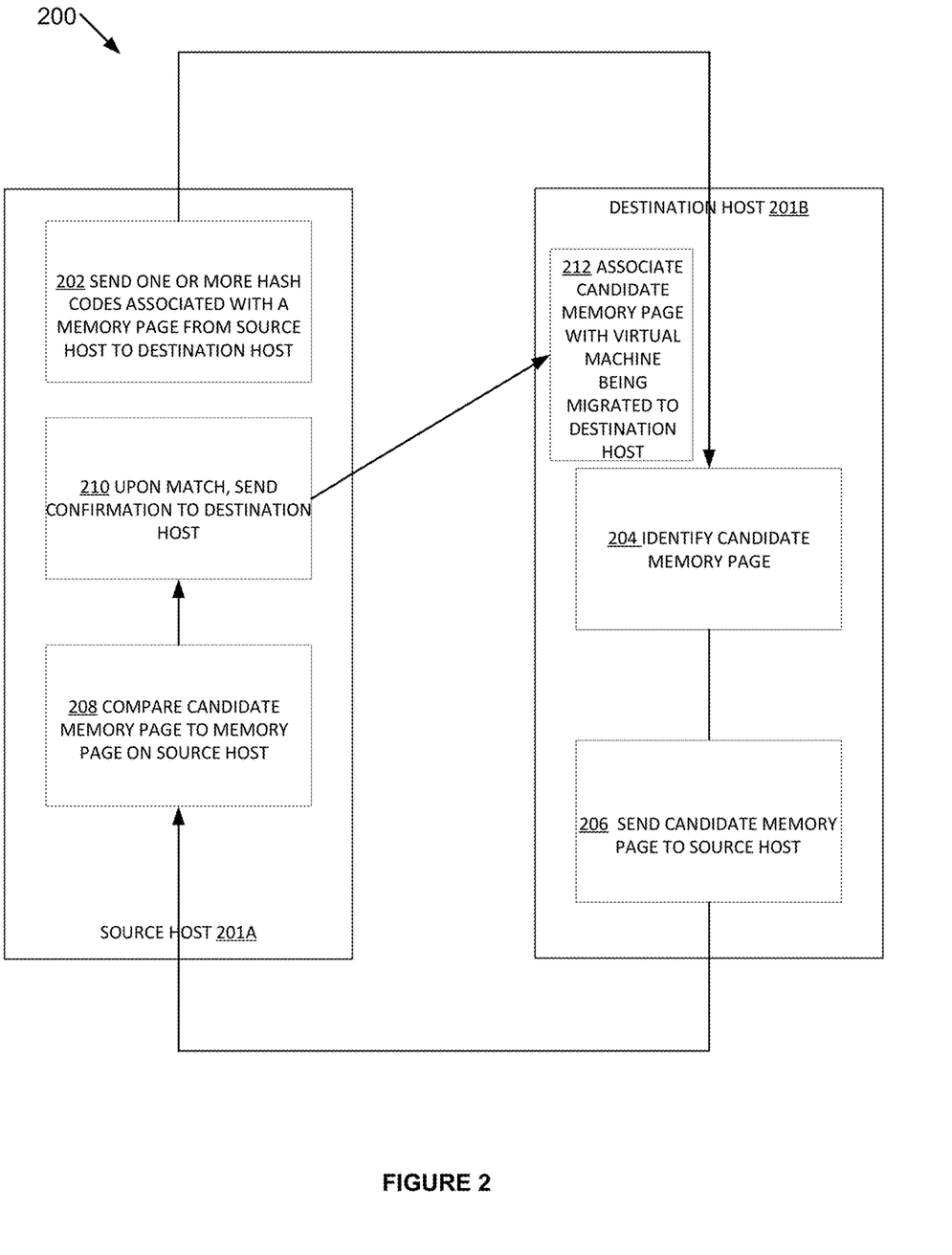
FIG. 2 is a flow diagram illustrating an implementation of a method executed by a host module (e.g., a hypervisor) for memory page copying for virtual machine migration in accordance with one or more aspects of the present disclosure.

FIG. 2 is a flow diagram illustrating an example method 200 for memory page copying for virtual machine migration between host computer systems operating in accordance with one or more aspects of the present disclosure. Method 200 may be performed by processing logic (e.g., in computer system 500 of FIG. 5) that may comprise hardware (e.g., circuitry, dedicated logic, programmable logic, microcode, etc.), software (such as instructions run on a processing device), firmware, or a combination thereof.

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 2, in one embodiment, method 200 begins at block 202 when the source host computer system 201A sends to the destination host computer system 201B one or more hashes, such that each hash is associated with a respective memory page residing in the memory of the destination host 201B. "Hash" herein refers to a value of an irreversible function mapping a sequence of bytes (e.g., a memory page) to a bit sequence of a pre-determined size, such that two different input sequences are unlikely to produce the same hash value.

In an illustrative example, the source host computer system 201A may send the hash in response to a triggering event such as a migration request received via a graphical user interface (GUI) or an application programming interface (API). The GUI or API may reside on the destination host 201B. In another illustrative example, the migration request may be received in response to detecting a triggering condition, e.g., resource utilization by the source host computer system 101A exceeding a threshold.

At block 204, the destination host computer system 201B may iterate through the hashes received from the source host computer system 201A and compare the received hashes with the hashes of local memory pages that are resident on the destination host computer system. Thus, the destination host computer system may identify, among the local memory pages, a candidate memory page having the hash matching one of the hashes received from the source host computer system. In an illustrative example, the destination host computer system may further determine that the candidate memory page is associated with an image of the virtual machine that is being migrated from the source host computer system to the destination host computer system. In another illustrative example, a plurality of hashes may be received from the destination host computer system, wherein each hash of the plurality of hashes is associated with a memory page associated with the virtual machine being migrated from the source host computer system to the destination host computer system. The destination host computer system may identify, as the candidate memory page, a memory page matching a hash of the plurality of hashes.

At block 206, the identified candidate memory page may be sent to the source host computer system 201A by the destination host computer system 201B. In an illustrative example, the full content of the identified candidate memory pages may be sent to the source host computer system 201A. In another illustrative example, one or more parts of the identified candidate memory pages may be sent to the source host computer system 201A.

At block 208, the source host computer system 201A may compare the received candidate memory page to one or more memory pages located on the source host computer system 201A. At block 210, upon detecting a match between the candidate memory page and a local memory page residing in the memory of the source host computer system 201A, the source host computer system 201A may send a confirmation of the match to the destination host computer system 201B.

At block 212, upon receiving the confirmation, the destination host computer system 201B may associate the candidate memory page with a virtual machine being migrated to the destination host computer system 201B from the source host computer system 201A. Upon determining a mismatch between the candidate memory page and the one or more memory pages located on the source host computer system 201A, the candidate memory page is not used upon migration of the virtual machine to the destination host computer system 201B.

Figure 3:
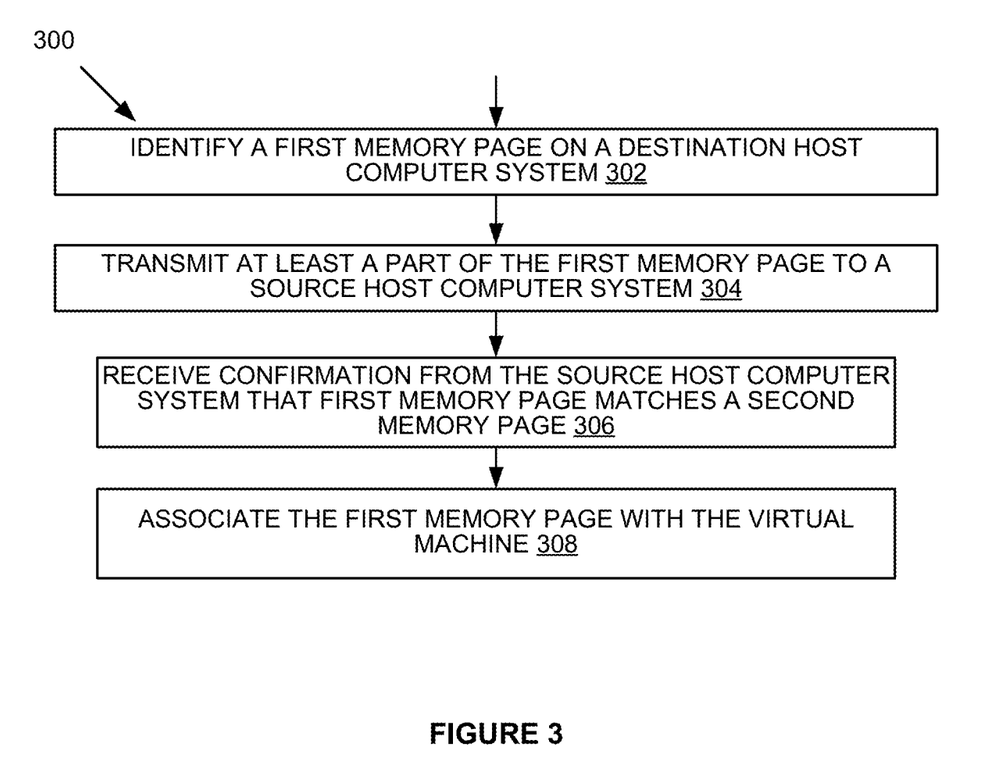
FIG. 3 is a flow diagram illustrating another implementation of a method executed by a host module (e.g., a hypervisor) for memory page copying for virtual machine migration in accordance with one or more aspects of the present disclosure.

FIG. 3 is a flow diagram of a method 300 for memory page copying for virtual machine migration in accordance with one or more aspects of the present disclosure. Method 300 may be performed by processing logic (e.g., in computer system 500 of FIG. 5) that may comprise hardware (e.g., circuitry, dedicated logic, programmable logic, microcode, etc.), software (such as instructions run on a processing device), firmware, or a combination thereof. In one embodiment, method 300 is performed primarily by a source hypervisor (e.g., source hypervisor 115a) residing on the source host.

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

In an illustrative example, the destination hypervisor may initiate migration in response to a triggering event such as a migration request received via a graphical user interface (GUI) or an application programming interface (API). The GUI or API may reside on the destination hypervisor. In another illustrative example, the migration request may be received in response to detecting a triggering condition, e.g., resource utilization by the source host computer system exceeding a threshold.

At block 304, at least a part of the first memory page is transmitted to a source host computer system. In one embodiment, the full contents of the identified first memory page may be sent to the source host computer system. In another illustrative example, one or more parts of the identified first memory page may be sent to the source host computer system.

At block 306, the destination host computer system receives a confirmation from the source host computer system that the identified first memory page matches a second memory page associated with a virtual machine being migrated from the source host computer system to the destination host computer system. In one embodiment, responsive to sending the identified first memory page to the source host computer system, the source hypervisor compares the contents of the first memory page to the contents of the second memory page. If there is a match detected between the first memory page and the second memory page based on the contents of the first and second memory pages, then the destination host computer system receives the confirmation from the source host computer system. The confirmation may be sent to the destination host computer system by the source hypervisor. In one embodiment, if a match is not detected between the first memory page and the second memory page, then the first memory page is not used upon migration of the virtual machine to the destination host computer system.

At block 308, upon migrating the virtual machine to the destination host computer system, the first memory page is associated with the virtual machine. In an illustrative example, the destination hypervisor may initiate migration in response to a triggering event such as a migration request received via a graphical user interface (GUI) or an application programming interface (API). The GUI or API may reside on the destination hypervisor. In another illustrative example, the migration request may be received in response to detecting a triggering condition, e.g., resource utilization by the source host computer system exceeding a threshold.

Figure 4:
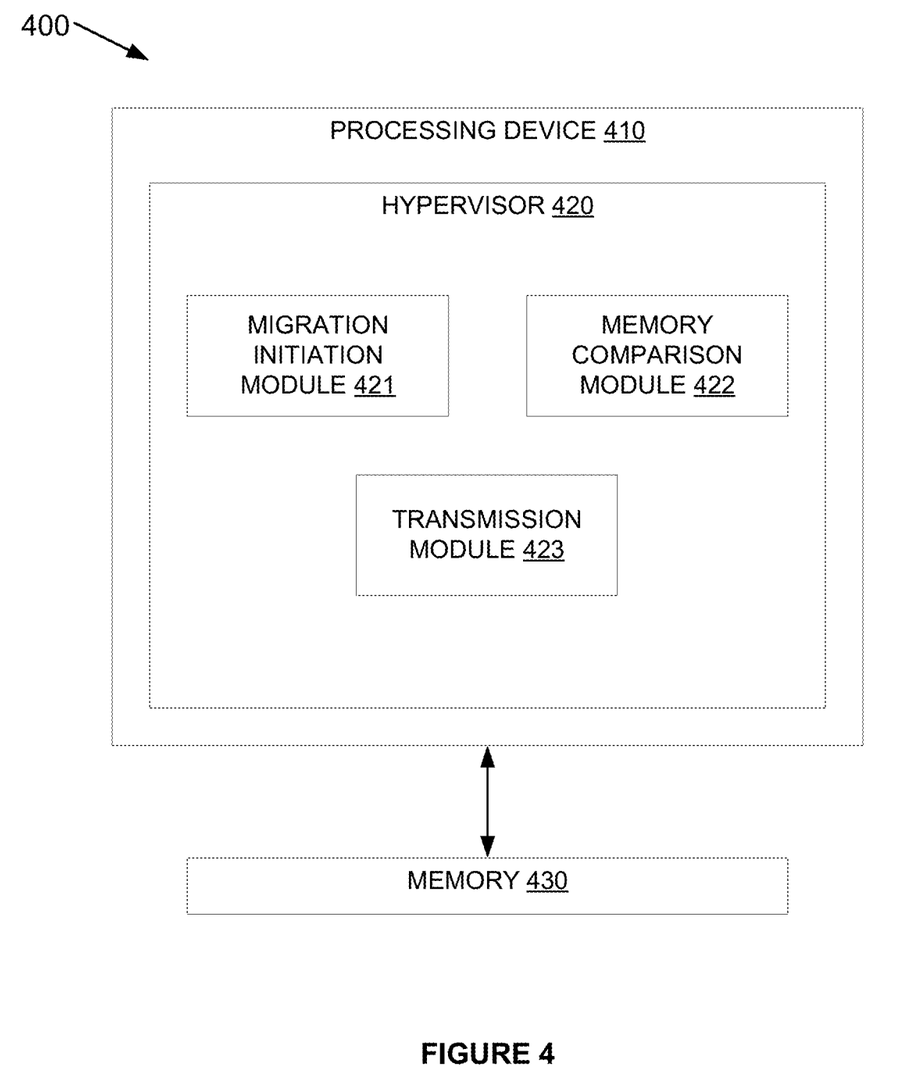
FIG. 4 is a block diagram example of a computer system operating in accordance with one or more aspects of the present disclosure.

FIG. 4 is a block diagram example of a computer system 400 operating in accordance with one or more aspects of the present disclosure. Computer system 400 may be the same or similar to the source host computer system 101A and the destination host computer system 101B of FIG. 1 and may include one or more processing devices and one or more memory devices. In the example shown, computer system 400 may include migration initiation module 421, memory comparison module 422, and transmission module 423. Alternatively, the functionality of one or more of migration initiation module 421, memory comparison module 422, and transmission module 423 may be combined into a single module or divided into multiple sub-modules.

Migration initiation module 421 is responsible for initiating the live migration of a VM from a source host computer system to a destination host computer system. In an illustrative example, migration initiation module 421 may initiate live migration in response to a triggering event such as a migration request received via a graphical user interface (GUI) or an application programming interface (API). The GUI or API may reside on the destination hypervisor. In another illustrative example, the migration request may be received in response to detecting a triggering condition, e.g., resource utilization by the source host computer system exceeding a threshold.

Memory comparison module 422 is responsible for comparing a first memory page on a destination host computer system to a second memory page on a source host computer system. In one embodiment, the memory comparison module 422 may compare the first and second memory pages based on the contents of the first and second memory pages. The memory comparison module 422 may also be responsible for sending a confirmation that the first memory page matches the second memory page.

Transmission module 423 is responsible for transmitting memory pages from the source host computer system to the destination host computer system or from the destination host computer system to the source host computer system. Transmission module 423 may also be responsible for transmitting one or more hashes associated with memory pages from the source host computer system to the destination host computer system or from the destination host computer system to the source host computer system. Transmission module 423 may also be responsible for transmitting the contents of memory pages from the source host computer system to the destination host computer system or from the destination host computer system to the source host computer system. In an illustrative example, the full content of the memory pages may be transmitted. In another illustrative example, one or more parts of the memory pages may be transmitted.

Figure 5:
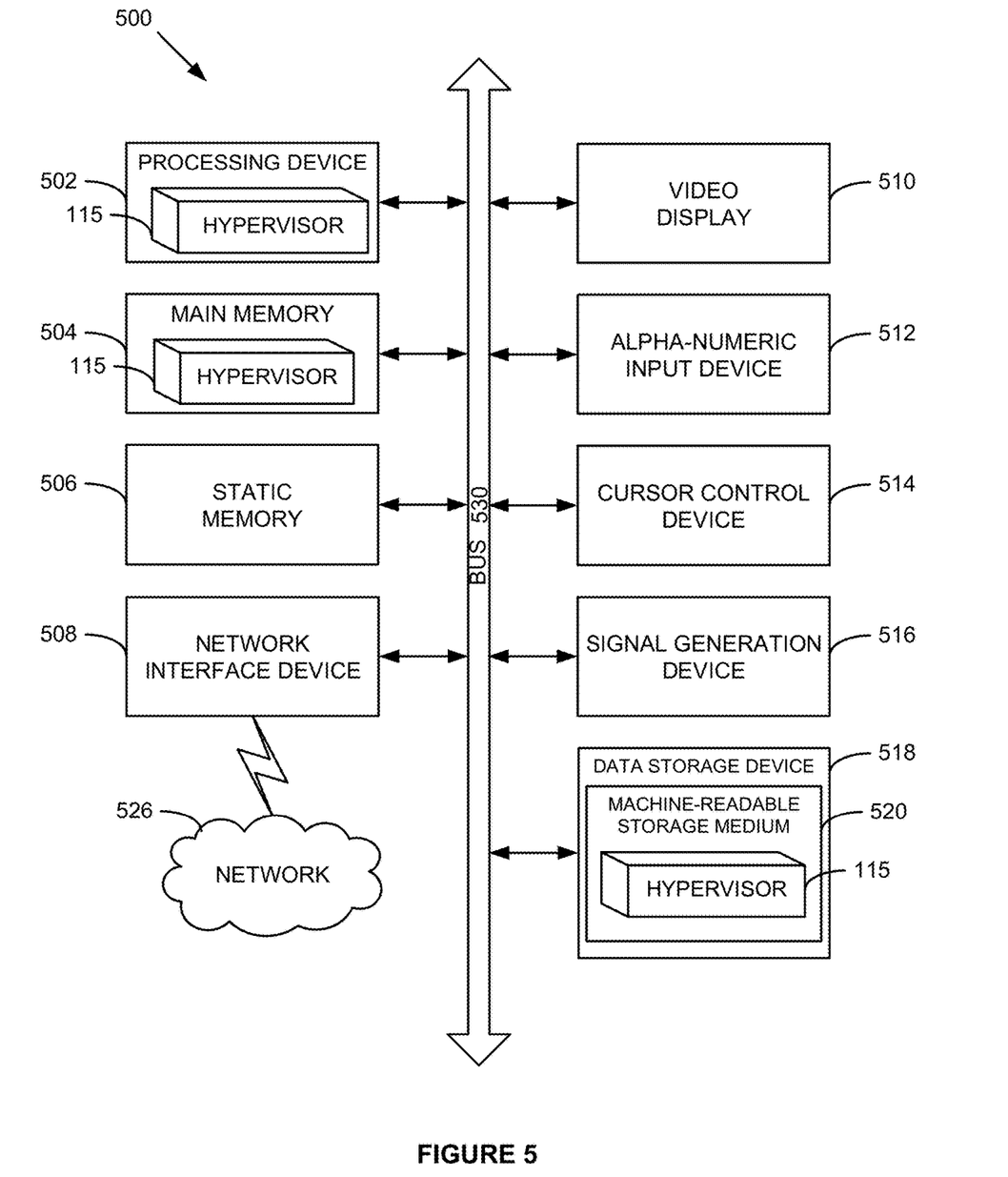
FIG. 5 is a block diagram that illustrates one implementation of a computer system in accordance with one or more aspects of the present disclosure.

FIG. 5 is a diagrammatic representation of a machine in the exemplary form of a computer system 500 within which a set of instructions for causing the machine to perform any one or more of the methodologies discussed herein may be executed. In various illustrative examples, computer system 500 may correspond to source host 101a and/or destination host 101b of FIG. 1. Computer system 500 may be included within a data center that supports virtualization. Virtualization within a data center results in a physical system being virtualized using virtual machines to consolidate the data center infrastructure and increase operational efficiencies. A VM may be a program-based emulation of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain embodiments, computer system 500 may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. Computer system 500 may be provided by a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that device. Further, while only a single machine is illustrated, the term "computer" shall also be taken to include any collection of computers that individually or jointly execute a set (or multiple sets) of instructions to perform any one or more of the methodologies discussed herein.

The example computer system 500 may include a processing device 502, a main memory 504 (e.g., read-only memory (ROM), flash memory, dynamic random access memory (DRAM) (such as synchronous DRAM (SDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets. Processing device 502 may also be one or more special-purpose processing devices such as an application specific integrated circuit (ASIC), a field programmable gate array (FPGA), a digital signal processor (DSP), network processor, or the like. Processing device 502 may be configured to execute hypervisor 115 for programming the operations and steps discussed herein.

Computer system 500 may further include a network interface device 408. Computer system 500 may also include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Data storage device 518 may include a machine-readable storage medium (or more specifically a computer-readable storage medium) 520 having one or more sets of instructions (e.g., the hypervisor 115) embodying any one or more of the methodologies of functions described herein. The hypervisor 115 may also reside, completely or at least partially, within main memory 504 and/or within processing device 502 during execution thereof by computer system 500; main memory 504 and processing device 502 also constituting machine-readable storage media. Hypervisor 115 may further be transmitted or received over a network 526 via network interface device 508.

Machine-readable storage medium 520 may also be used to store the device queue manner logic persistently. While machine readable storage medium 520 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling," "transmitting," "requesting," "identifying," "querying," "retrieving," "forwarding," "determining," "passing," "processing," "issuing," "measuring," "caching," "monitoring," mapping," "estimating," "calculating," "disabling," "detecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), erasable programmable ROMs (EPROMs), electrically erasable programmable ROMs (EEPROMs), magnetic or optical cards, flash memory devices including universal serial bus (USB) storage devices (e.g., USB key drives) or any type of media suitable for storing electronic instructions, each of which may be coupled to a computer system bus.

The methods and illustrative examples described herein are not inherently related to any particular computer or other apparatus. Various general purpose systems may be used with programs in accordance with the teachings herein or it may prove convenient to construct more specialized apparatus to perform the required method 200, and/or each of their individual functions, routines, subroutines or operations. Examples of the structure for a variety of these systems are set forth in the description above.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

Other computer system designs and configurations may also be suitable to implement the system and methods described herein. The following examples illustrate various implementations in accordance with one or more aspects of the present disclosure.

Example 1 is a method comprising: identifying, on a destination host computer system, a first memory page residing in a memory of the destination host computer system; transmitting, by the destination host computer system, at least a part of the first memory page to a source host computer system; receiving, by the destination host computer system, a confirmation that the first memory page matches a second memory page associated with a virtual machine being migrated from the source host computer system to the destination host computer system; and associating, by the destination host computer system, the first memory page with the virtual machine.

Example 2 includes the subject matter of example 1, wherein identifying the first memory page comprises: receiving, from the source host computer system, a hash associated with the second memory page; and determining that the hash of the first memory page matches the hash of the second memory page.

Example 3 includes the subject matter of example 1, wherein identifying the first memory page further comprises: determining that the first memory page is associated with an image of the virtual machine that is being migrated from the source host computer system to the destination host computer system.

Example 4 includes the subject matter of example 1, wherein identifying the first memory page further comprises: receiving, from the destination host computer system, a plurality of hashes, wherein each hash of the plurality of hashes is associated with a memory page associated with the virtual machine being migrated from the source host computer system to the destination host computer system; and identifying, as the first memory page, a memory page matching a hash of the plurality of hashes.

Example 5 includes the subject matter of example 1, wherein the source host computer system and the destination host computer system are interconnected by an asymmetrical communication network, such that a first bandwidth of the first communication channel utilized for data transmission from the destination host computer system to the source host computer system exceeds a second bandwidth of the first communication channel utilized for data transmission from the source host computer system to the destination host computer system.

Example 6 includes the subject matter of example 1, wherein identifying the first memory page is performed in response to a migration triggering event.

Example 7 includes the subject matter of example 1, further comprising: starting the virtual machine on the destination host computer system.

Example 8 is a system comprising: a memory; and a processing device operatively coupled to the memory, the processing device to implement the subject matter of any of examples 1-7.

Example 9 is a non-transitory machine-readable storage medium including instructions that, when accessed by a processing device, cause the processing device to implement the subject matter of any of examples 1-7.

Unless specifically stated otherwise, terms such as "receiving," "generating," "starting," "comparing," "notifying," "providing," "storing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 and 500 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method comprising:
    during a live migration of a virtual machine from a source host computer system to a destination host computer system to generate a migrated virtual machine on the destination host computer system, performing by the destination host computer system the steps of:
        receiving a plurality of memory page hashes of a plurality of corresponding memory pages including a memory page hash of a second memory page of the source host computer system;
        identifying a first memory page residing in a memory of the destination host computer system based on the memory page hash of the second memory page, wherein the first memory page matches the second memory page;
        transmitting, by the destination host computer system, at least a part of the first memory page to the source host computer system;
        subsequent to the transmitting, receiving, by the destination host computer system, a confirmation from the source host computer system that the first memory page matches the second memory page on the source host computer system associated with the virtual machine;
        in response to receiving the confirmation, associating, by the destination host computer system, the first memory page with the migrated virtual machine; and
        based on the associating, using the first memory page by the migrated virtual machine executing on the destination host computer system.

2. The method of claim 1, wherein identifying the first memory page comprises:
    determining that a memory page hash of the first memory page matches the memory page hash of the second memory page.

3. The method of claim 1, wherein identifying the first memory page further comprises: determining that the first memory page is associated with an image of the virtual machine that is being migrated from the source host computer system to the destination host computer system.

4. The method of claim 1, wherein the source host computer system and the destination host computer system are interconnected by an asymmetrical communication network, such that a first bandwidth of a first communication channel utilized for data transmission from the destination host computer system to the source host computer system exceeds a second bandwidth of the first communication channel utilized for data transmission from the source host computer system to the destination host computer system.

5. The method of claim 1, wherein identifying the first memory page is performed in response to a migration triggering event.

6. The method of claim 1, further comprising:
starting the migrated virtual machine on the destination host computer system.

7. A system comprising:
a memory; and
a processor, operatively coupled to the memory, the processor to:
during a live migration of a virtual machine from a source host computer system to the system to generate a migrated virtual machine on the system, performing by the system the steps of:
receiving a plurality of memory page hashes of a plurality of corresponding memory pages including a memory page hash of a second memory page of the source host computer system;
identifying a first memory page residing in the memory of the system based on the memory page hash of the second memory page, wherein the first memory page matches the second memory page;
transmitting at least a part of the first memory page to the source host computer system;
subsequent to the transmitting, receiving a confirmation from the source host computer system that the first memory page matches the second memory page on the source host computer system associated with the virtual machine;
in response to receiving the confirmation, associating the first memory page with the migrated virtual machine; and
based on the associating, using the first memory page by the migrated virtual machine executing on the system.

8. The system of claim 7, wherein to identify the first memory page, the processor is further to:
determine that a memory page hash of the first memory page matches the memory page hash of the second memory page.

9. The system of claim 7, wherein to identify the first memory page, the processor is further to: determine that the first memory page is associated with an image of the virtual machine that is being migrated from the source host computer system to the system.

10. The system of claim 7, wherein the source host computer system and the system are interconnected by an asymmetrical communication network, such that a first bandwidth of a first communication channel utilized for data transmission from the system to the source host computer system exceeds a second bandwidth of the first communication channel utilized for data transmission from the source host computer system to the system.

11. The system of claim 7, wherein identifying the first memory page is performed in response to a migration triggering event.

12. The system of claim 7, wherein the processor is further to:
start the migrated virtual machine on the system.

13. A non-transitory computer readable storage medium comprising instructions that, when executed by a processor, cause the processor to perform operations comprising:
during a live migration of a virtual machine from a source host computer system to a destination host computer system to generate a migrated virtual machine on the destination host computer system, performing by the destination host computer system the steps of:
receiving a plurality of memory page hashes of a plurality of corresponding memory pages including a memory page hash of a second memory page of the source host computer system;
identifying a first memory page residing in a memory of the destination host computer system based on the memory page hash of the second memory page, wherein the first memory page matches the second memory page;
transmitting, by the destination host computer system, at least a part of the first memory page to the source host computer system;
subsequent to the transmitting, receiving, by the destination host computer system, a confirmation from the source host computer system that the first memory page matches the second memory page on the source host computer system associated with the virtual machine;
in response to receiving the confirmation, associating, by the destination host computer system, the first memory page with the migrated virtual machine; and
based on the association, using the first memory page by the migrated virtual machine executing on the destination host computer system.

14. The non-transitory computer readable storage medium of claim 13, wherein identifying the first memory page comprises:
determining that a memory page hash of the first memory page matches the memory page hash of the second memory page.

15. The non-transitory computer readable storage medium of claim 13, wherein identifying the first memory page further comprises: determining that the first memory page is associated with an image of the virtual machine that is being migrated from the source host computer system to the destination host computer system.

16. The non-transitory computer readable storage medium of claim 13, wherein the source host computer system and the destination host computer system are interconnected by an asymmetrical communication network, such that a first bandwidth of the first communication channel utilized for data transmission from the destination host computer system to the source host computer system exceeds a second bandwidth of a first communication channel utilized for data transmission from the source host computer system to the destination host computer system.

17. The non-transitory computer readable storage medium of claim 13, wherein identifying the first memory page is performed in response to a migration triggering event.

* * * * *